(12) United States Patent
Toyama (10) Patent No.: US 10,845,259 B2
(45) Date of Patent: Nov. 24, 2020

(54) SENSOR DEVICE FOR DETECTING A ROTATION ANGLE OF A SHAFT

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 104 days.

(21) Appl. No.: 16/152,585

(22) Filed: Oct. 5, 2018

(65) Prior Publication Data
US 2019/0113405 A1  Apr. 18, 2019

(30) Foreign Application Priority Data
Oct. 13, 2017  (JP) .................. 2017-199462

(51) Int. Cl.
| | |
|---|---|
| *G01L 3/10* | (2006.01) |
| *B62D 6/10* | (2006.01) |
| *B62D 15/02* | (2006.01) |
| *G01D 5/14* | (2006.01) |
| *G01D 11/24* | (2006.01) |

(52) U.S. Cl.
CPC ............. *G01L 3/104* (2013.01); *B62D 6/10* (2013.01); *B62D 15/0215* (2013.01); *G01D 5/145* (2013.01); *G01D 11/245* (2013.01)

(58) Field of Classification Search
CPC ....... G01L 3/104; B62D 6/10; B62D 15/0215; G01D 5/145; G01D 11/245
USPC .................................................. 73/862.191
See application file for complete search history.

(56) References Cited

U.S. PATENT DOCUMENTS

| | | | | |
|---|---|---|---|---|
| 4,513,354 A | * | 4/1985 | Abel ................... | H01M 2/1055 340/547 |
| 7,868,611 B2 | * | 1/2011 | Sano ................... | G01D 11/245 324/207.25 |
| 8,448,742 B2 | * | 5/2013 | Kawada ............... | B62D 1/16 180/443 |
| 2006/0236784 A1 | | 10/2006 | Feng et al. | |
| 2014/0208890 A1 | | 7/2014 | Takayanagi et al. | |

(Continued)

FOREIGN PATENT DOCUMENTS

| | | |
|---|---|---|
| DE | 102004023801 A1 | 8/2005 |
| JP | 2013-92461 A | 5/2013 |

OTHER PUBLICATIONS

Mar. 1, 2019 Extended Search Report issued in European Application No. 18199538.2.

*Primary Examiner* — Octavia Hollington
(74) *Attorney, Agent, or Firm* — Oliff PLC (57) ABSTRACT

Provided is a sensor device that is machinable and mountable easily. A sensor device includes an external gear configured to rotate together with a pinion shaft, driven gears configured to rotate by meshing with the external gear, permanent magnets configured to rotate together with the driven gears, magnetic sensors configured to detect magnetic fields of the permanent magnets, a circuit board assembly having the magnetic sensors mounted on a printed circuit board, a tubular first housing member that houses the external gear, and a second housing member that supports the driven gears and houses the circuit board assembly. The second housing member has a flange portion that abuts against an open end face of a fitting hole of the first housing member, and parts of the driven gears that protrude from the flange portion mesh with the external gear inside the first housing member.

9 Claims, 9 Drawing Sheets

(56) References Cited

U.S. PATENT DOCUMENTS

2016/0214648 A1 7/2016 Schoepe et al.
2019/0113404 A1* 4/2019 Toyama .................. G01L 3/104

* cited by examiner

SENSOR DEVICE FOR DETECTING A ROTATION ANGLE OF A SHAFT

INCORPORATION BY REFERENCE

The disclosure of Japanese Patent Application No. 2017-199462 filed on Oct. 13, 2017 including the specification, drawings and abstract, is incorporated herein by reference in its entirety.

BACKGROUND OF THE INVENTION

1. Field of the Invention

The present invention relates to a sensor device configured to detect a rotation angle of a shaft supported so as to be rotatable relative to a support.

2. Description of the Related Art

Hitherto, a sensor device configured to detect a rotation angle of a shaft is used in, for example, a steering system of a vehicle (see, for example, Japanese Patent Application Publication No. 2013-92461 (JP 2013-92461 A)).

In the steering system described in JP 2013-92461 A, a steering shaft is inserted through a tubular case member serving as a support, and a rotation angle of the steering shaft along with a steering operation for a steering wheel is detected by a rotation angle sensor of the sensor device. The steering shaft is rotatably supported by a bearing arranged between the inner peripheral surface of the case member and the outer peripheral surface of the steering shaft.

The rotation angle sensor has a box-shaped sensor body. The sensor body houses components such as a detection gear and a circuit board. The detection gear meshes with external teeth formed on a holding member that rotates together with the steering shaft. The detection gear has a placement stage for fixing a magnet. A magnetic sensor is mounted on the circuit board. A magnetic field of the magnet fixed to the placement stage of the detection gear is applied to the magnetic sensor. The rotation angle of the steering shaft (steering angle) is detected based on a signal output from the magnetic sensor. A housing portion for housing the sensor body is formed in the case member. The housing portion houses a major part of the sensor body, and a flange portion formed at one end of the sensor body is fixed to the open end face of the housing portion.

In order to secure the support rigidity for the steering shaft in the case member of the steering system that is formed as described above, the case member is formed of a metal such as aluminum. It is highly difficult to machine the case member so as to form the housing portion that houses the box-shaped sensor body, thereby requiring a large number of man hours. Further, a large number of man hours is required in an operation of inserting and fixing the circuit board in the box-shaped sensor body.

SUMMARY OF THE INVENTION

It is one object of the present invention to provide a sensor device that is easily machinable and mountable, whereby the manufacturing cost can be reduced.

One aspect of the present invention relates to a sensor device configured to detect a rotation angle of a shaft with respect to a support. The shaft is supported so as to be rotatable relative to the support.

The sensor device includes an external gear, a driven gear, a rotation angle detection permanent magnet, a rotation angle detection magnetic sensor, a circuit board assembly, a tubular first housing member, and a second housing member. The external gear is configured to rotate together with the shaft. The driven gear is configured to rotate by meshing with the external gear. The rotation angle detection permanent magnet is configured to rotate together with the driven gear. The rotation angle detection magnetic sensor is configured to detect a magnetic field of the rotation angle detection permanent magnet. The circuit board assembly has the rotation angle detection magnetic sensor mounted on a printed circuit board. The first housing member houses the external gear. The second housing member supports the driven gear and houses the circuit board assembly.

The first housing member has a fitting hole open in a radial direction perpendicular to an axial direction parallel to a rotation axis of the shaft. The second housing member has a flange portion that abuts against an open end face of the fitting hole, and a part of the driven gear that protrudes from the flange portion is inserted into the first housing member and meshed with the external gear.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
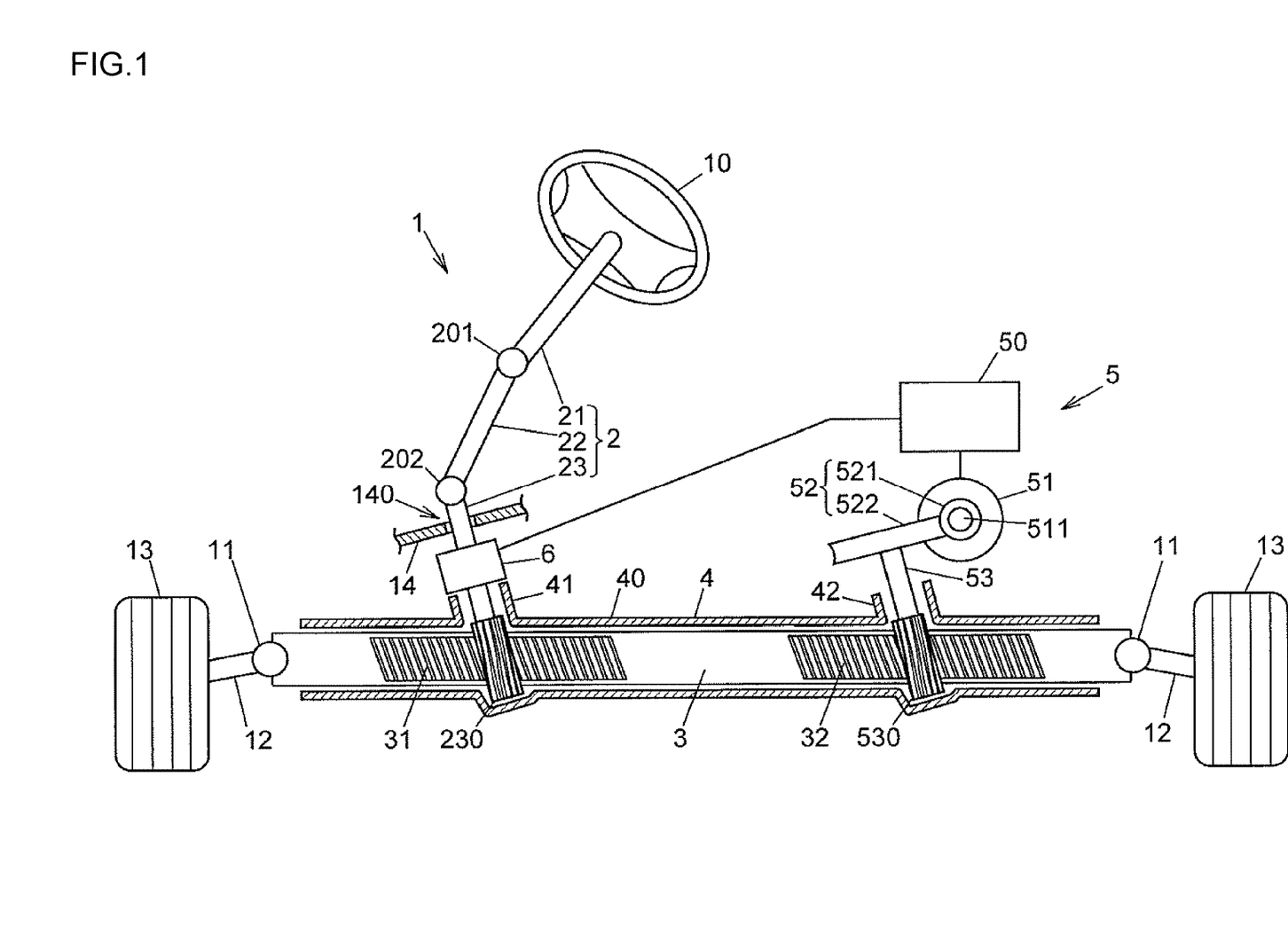
FIG. 1 is a structural view schematically illustrating an example of the structure of a steering system including a sensor device according to an embodiment of the present invention.

An embodiment of the present invention is described below with reference to the drawings. FIG. 1 is a structural view schematically illustrating an example of the structure of a steering system including a sensor device according to the embodiment of the present invention.

A steering system 1 includes a steering wheel 10, a column shaft 21, an intermediate shaft 22, a first pinion shaft 23, a rack shaft 3, a rack housing 4, a steering assist device 5, and a sensor device 6. The steering wheel 10 is operated to rotate by a driver. The steering wheel 10 is fixed to one end of the column shaft 21. The intermediate shaft 22 is coupled to the column shaft 21 via a universal joint 201. The first pinion shaft 23 is coupled to the intermediate shaft 22 via a universal joint 202. The rack shaft 3 serves as a steering operation shaft that meshes with the first pinion shaft 23. The rack housing 4 houses the rack shaft 3, and extends in a vehicle width direction. The steering assist device 5 assists a driver's steering operation. The sensor device 6 detects a steering angle and a steering torque.

For example, the universal joints 201 and 202 are cardan joints. The column shaft 21, the intermediate shaft 22, and the first pinion shaft 23 constitute a steering shaft 2 configured to transmit, to the rack shaft 3, a steering torque applied to the steering wheel 10. The first pinion shaft 23 is a member corresponding to a shaft of the present invention, which rotates in response to the steering operation of the steering wheel 10. A pinion toothing 230 is formed at one end of the first pinion shaft 23.

The steering assist device 5 includes a controller 50, an electric motor 51, a speed reducing mechanism 52, and a second pinion shaft 53. The electric motor 51 generates a torque based on a motor current output from the controller 50. The speed reducing mechanism 52 reduces the speed of rotation of an output shaft 511 of the electric motor 51. The second pinion shaft 53 is rotated by the torque of the electric motor 51 that is obtained through the speed reduction performed by the speed reducing mechanism 52. The speed reducing mechanism 52 includes a worm 521 and a worm wheel 522. The worm 521 is coupled to the output shaft 511 of the electric motor 51 so as to rotate together with the output shaft 511. The worm wheel 522 meshes with the worm 521. The worm wheel 522 rotates together with the second pinion shaft 53, and applies a steering assist torque to the second pinion shaft 53. A pinion toothing 530 is formed on the second pinion shaft 53. For example, the controller 50 controls the electric motor 51 based on the steering torque applied to the steering wheel 10, the steering angle of the steering wheel 10, and a vehicle speed.

A first rack toothing 31 and a second rack toothing 32 are formed on the rack shaft 3. The first rack toothing 31 meshes with the pinion toothing 230 of the first pinion shaft 23. The second rack toothing 32 meshes with the pinion toothing 530 of the second pinion shaft 53. Ball joint sockets 11 and 11 are fixed to both ends of the rack shaft 3. Tie rods 12 and 12 are coupled to a pair of right and left front wheels 13 and 13 via knuckle arms (not illustrated), respectively. The tie rods 12 and 12 are coupled to the ball joint sockets 11 and 11, respectively. The rack shaft 3 turns the right and left front wheels 13 and 13 that are steered wheels through an advancing or retreating movement in the vehicle width direction.

The rack housing 4 has a body portion 40, a first tubular portion 41, and a second tubular portion 42. The body portion 40 houses the rack shaft 3. The first tubular portion 41 houses a part of the first pinion shaft 23 including the pinion toothing 230. The second tubular portion 42 houses a part of the second pinion shaft 53 including the pinion toothing 530.

The first pinion shaft 23 is inserted through an insertion port 140 provided in a dash panel 14 that demarcates the inside and outside of a vehicle cabin. The sensor device 6 is arranged outside the vehicle cabin below the dash panel 14 in FIG. 1.

Figure 2:
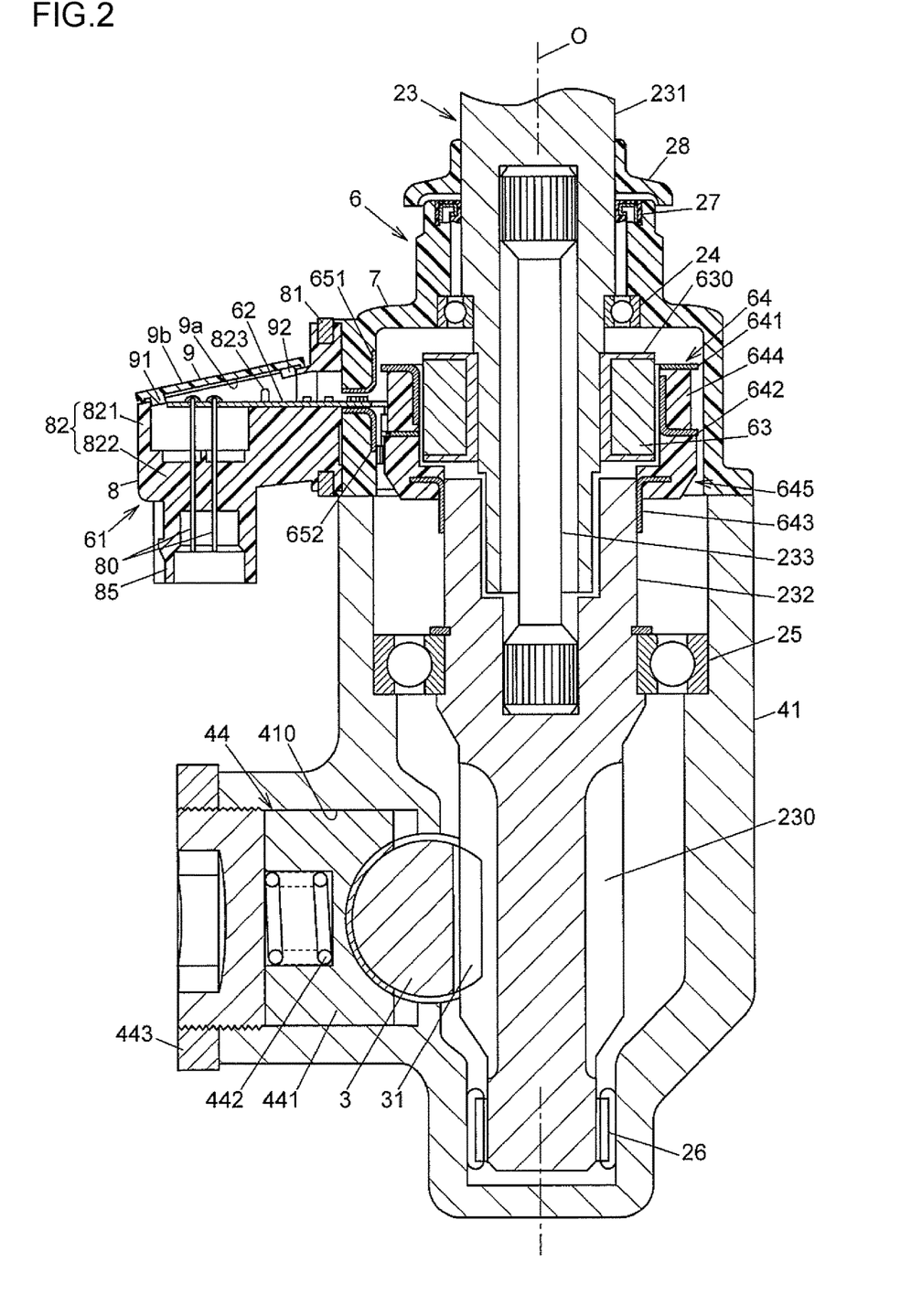
FIG. 2 is a sectional view illustrating the inside of a first tubular portion of a rack housing in a cross section including a rotation axis of a first pinion shaft.

FIG. 2 is a sectional view illustrating the inside of the first tubular portion 41 of the rack housing 4 in a cross section including a rotation axis of the first pinion shaft 23. The first pinion shaft 23 is hereinafter referred to simply as a pinion shaft 23.

The pinion shaft 23 has an input shaft 231 and an output shaft 232. The input shaft 231 is coupled to the second universal joint 202. The output shaft 232 has the pinion toothing 230. The pinion shaft 23 is formed by coupling the input shaft 231 and the output shaft 232 together by a flexible torsion bar (torsion shaft) 233. The torsion bar 233 is twisted by the steering torque, and the input shaft 231 and the output shaft 232 serving as a pair of rotation shaft members rotate relative to each other at an angle corresponding to the twisting amount. A direction parallel to a rotation axis O of the pinion shaft 23 is hereinafter referred to as an axial direction, and a direction perpendicular to the axial direction is hereinafter referred to as a radial direction. One side in the axial direction that corresponds to the top of FIG. 2 is referred to as an upper side, and the other side in the axial direction that corresponds to the bottom of FIG. 2 is referred to as a lower side.

The input shaft 231 is rotatably supported on a first housing member 7 (described later) of the sensor device 6 via a ball bearing 24. The sensor device 6 is fixed to the upper end of the first tubular portion 41. A portion of the output shaft 232 that is located above the pinion toothing 230 is supported by a ball bearing 25. A portion of the output shaft 232 that is located below the pinion toothing 230 is supported by a needle roller bearing 26. The pinion shaft 23 is supported by the ball bearings 24 and 25 and the needle roller bearing 26 so as to be rotatable relative to the rack housing 4 serving as a support. The input shaft 231 is inserted through the first housing member 7. A seal member 27 is attached to the inner peripheral surface of the first housing member 7 at its upper end. The seal member 27 is in sliding contact with the outer peripheral surface of the input shaft 231. An umbrella-shaped cover member 28 is attached to the input shaft 231. The cover member 28 covers the upper end of the first housing member 7.

The rack housing 4 houses a rack guide mechanism 44 configured to elastically press the rack toothing 31 of the rack shaft 3 against the pinion toothing 230 of the pinion shaft 23. The rack guide mechanism 44 includes a support yoke 441, a coil spring 442, and a plug 443. The support yoke 441 is housed in a housing hole 410 provided in the first tubular portion 41 so as to be movable in advancing and retreating directions. The coil spring 442 urges the support yoke 441 toward the back face of the gear of the rack shaft 3. The plug 443 closes the opening of the housing hole 410.

The sensor device 6 detects a rotation angle of the pinion shaft 23 with respect to the rack housing 4, and also detects a steering torque transmitted between the input shaft 231 and the output shaft 232 based on the twisting amount of the torsion bar 233. In this embodiment, the sensor device 6 detects a rotation angle of the output shaft 232 as the steering angle. Information on the rotation angle detected by the sensor device 6 is used for various types of control for the vehicle. For example, the information on the rotation angle is used for control to prevent a sideslip of a vehicle in a driving stabilization device (stability control system) configured to stabilize driving of the vehicle.

Next, the structure of the sensor device 6 is described in detail with reference to FIG. 2 to FIG. 11. The sensor device 6 includes a sensor housing 61, a circuit board assembly 62, a tubular ring magnet 63, a yoke unit 64, first and second magnetic flux collecting rings 651 and 652, first and second driven gears 66 and 67, a rotation angle detection first permanent magnet 68, and a rotation angle detection second permanent magnet 69. The circuit board assembly 62 is formed by mounting electronic components such as rotation angle detection magnetic sensors 621 and 622 and torque detection magnetic sensors 623 and 624 on a printed circuit board 620. The ring magnet 63 is fixed to the input shaft 231. The yoke unit 64 is formed by integrating first and second yokes 641 and 642 and a fitting ring 643 in a resin portion 644. The first and second yokes 641 and 642 serve as a magnetic path of a magnetic flux of the ring magnet 63. The first and second magnetic flux collecting rings 651 and 652 are arranged in relation to the first and second yokes 641 and 642, respectively. The first and second driven gears 66 and 67 rotate while meshing with an external gear 645 formed on the resin portion 644 of the yoke unit 64. The rotation angle detection first permanent magnet 68 rotates together with the first driven gear 66. The rotation angle detection second permanent magnet 69 rotates together with the second driven gear 67.

The sensor housing 61 has the tubular first housing member 7, a second housing member 8, and a lid 9 having a flat-plate shape. The first housing member 7 houses the yoke unit 64 including the external gear 645. The second housing member 8 supports the first and second driven gears 66 and 67, and houses the circuit board assembly 62. The lid 9 is attached to the second housing member 8.

In the yoke unit 64, the first and second yokes 641 and 642 and the fitting ring 643 are integrated in the resin portion 644 by insert molding. The upper end of the output shaft 232 is press-fitted to the fitting ring 643. The yoke unit 64 rotates together with the output shaft 232. The first and second yokes 641 and 642 are arranged on an outer side of the ring magnet 63 with a predetermined clearance from the outer peripheral surface of the ring magnet 63.

In the circuit board assembly 62, the rotation angle detection magnetic sensors 621 and 622, the torque detection magnetic sensors 623 and 624, and passive elements 635 such as a resistor and a capacitor are mounted on the printed circuit board 620. The torque detection magnetic sensors 623 and 624 are mounted on a first mounting surface 620a of the printed circuit board 620, and the rotation angle detection magnetic sensors 621 and 622 are mounted on a second mounting surface 620b of the printed circuit board 620. The torque detection magnetic sensors 623 and 624 may be mounted on the second mounting surface 620b.

The printed circuit board 620 is a solid circuit board having a wiring pattern (not illustrated) formed on the surface of a plate-shaped base material formed of an insulator such as glass epoxy. A plurality of (12 in this embodiment) electrodes 626 and two cutouts 620c are formed in the printed circuit board 620. The electrodes 626 are formed by through holes passing through the base material. Each of the torque detection magnetic sensors 623 and 624 is mounted over the cutout 620c. Each electrode 626 is connected to a terminal of the rotation angle detection magnetic sensor 621 or 622 or a terminal of the torque detection magnetic sensor 623 or 624 or to the passive element 635 by the wiring pattern. Two insertion holes 620d are formed in the printed circuit board 620. A pair of shaft-shaped protrusions 823 provided on the second housing member 8 are inserted through the insertion holes 620d, respectively.

The first driven gear 66 integrally has a gear portion 661, a cylindrical boss portion 662, and a columnar protruding portion 663. The gear portion 661 is formed of a spur gear having a plurality of gear teeth formed on its outer peripheral edge. The boss portion 662 protrudes to one side in a rotation axis direction from a central part of the gear portion 661. The protruding portion 663 protrudes to the other side in the rotation axis direction from the central part of the gear portion 661. The first permanent magnet 68 is fixed to an inner side of the boss portion 662. A tubular magnetic shield ring 660 is fitted to the outer peripheral surface of the boss portion 662. The magnetic shield ring 660 prevents interference of a magnetic field. The first driven gear 66 is formed of a resin, and the magnetic shield ring 660 is formed of a soft magnetic material such as iron.

Similarly, the second driven gear 67 integrally has a gear portion 671, a cylindrical boss portion 672, and a columnar protruding portion 673. The gear portion 671 is formed of a spur gear having a plurality of gear teeth formed on its outer peripheral edge. The boss portion 672 protrudes to the one side in a rotation axis direction from a central part of the gear portion 671. The protruding portion 673 protrudes to the other side in the rotation axis direction from the central part of the gear portion 671. The second permanent magnet 69 is fixed to an inner side of the boss portion 672. A tubular magnetic shield ring 670 is fitted to the outer peripheral surface of the boss portion 672. The magnetic shield ring 670 prevents interference of a magnetic field. The second driven gear 67 is formed of a resin, and the magnetic shield ring 670 is formed of a soft magnetic material such as iron.

The first driven gear 66 and the second driven gear 67 are different from each other in terms of the numbers of teeth of the gear portions 661 and 671. The number of teeth of the first driven gear 66 is larger than the number of teeth of the second driven gear 67. In this embodiment, the number of teeth of the first driven gear 66 is 26, and the number of teeth of the second driven gear 67 is 24. The number of teeth of the external gear 645 is 48.

A part of the rotation angle detection magnetic sensor 621 is arranged on the inner side of the boss portion 662 of the first driven gear 66 to face the first permanent magnet 68, thereby detecting a magnetic field of the first permanent magnet 68. A part of the rotation angle detection magnetic sensor 622 is arranged on the inner side of the boss portion 672 of the second driven gear 67 to face the second permanent magnet 69, thereby detecting a magnetic field of the second permanent magnet 69.

Each of the first and second permanent magnets 68 and 69 has a pair of magnetic poles (N pole and S pole). The rotation angle detection magnetic sensors 621 and 622 output signals having sinusoidal waveforms based on rotation angles of the first and second driven gears 66 and 67. Even if the steering wheel 10 is steered up to a maximum steering angle to the right or left and the pinion shaft 23 is rotated a plurality of times, the phases of the signals output from the magnetic sensors 621 and 622 are not synchronized because of the difference between the numbers of teeth of the first driven gear 66 and the second driven gear 67. Thus, the controller 50 can detect the absolute value of the rotation angle of the pinion shaft 23 based on the signals output from the magnetic sensors 621 and 622.

The second housing member 8 integrally has a flange portion 81 having a rectangular external shape, a bottomed frame portion 82, a protruding plate portion 83 having a flat-plate shape, a pair of side plate portions 84, and a tubular connector fitting portion 85. The flange portion 81 is brought into abutment against the first housing member 7. The bottomed frame portion 82 is provided opposite to the first housing member 7 across the flange portion 81. The protruding plate portion 83 protrudes toward the first housing member 7 across the flange portion 81, and supports the first and second driven gears 66 and 67. The side plate portions 84 protrude from the flange portion 81 toward the first housing member 7 at both ends of the protruding plate portion 83 in a longitudinal direction of the flange portion 81. A connector (not illustrated) for power supply to the circuit board assembly 62 and signal transmission to the controller 50 is fitted to the connector fitting portion 85.

A plurality of connection terminals 80 are fixed to the second housing member 8. One end of the connection terminal 80 protrudes into the connector fitting portion 85. The connection terminal 80 has a bar shape extending in the axial direction, and the other end of the connection terminal 80 protrudes into the bottomed frame portion 82. In the second housing member 8, a steel plate 810 and the connection terminals 80 are molded in a mold resin by insert molding. The flange portion 81 is constituted by the steel plate 810. A pair of bolt insertion holes 810a are formed in the steel plate 810. Bolts 70 (illustrated in FIG. 11) for fixing the second housing member 8 to the first housing member 7 are inserted through the bolt insertion holes 810a. For example, nylon 66 may be used as the mold resin that forms the second housing member 8.

The protruding plate portion 83 is continuously provided on a bottom 822, and has support holes 831 and 832. The protruding portion 663 of the first driven gear 66 is loosely fitted to the support hole 831. The protruding portion 673 of the second driven gear 67 is loosely fitted to the support hole 832. The rotation axes of the first and second driven gears 66 and 67 are located on the first housing member 7 side with respect to the flange portion 81.

The bottomed frame portion 82 has a frame 821, the bottom 822, and the shaft-shaped protrusions 823. The frame 821 has a substantially trapezoidal shape as viewed in the axial direction. The bottom 822 closes one side of the frame 821 in the axial direction. The shaft-shaped protrusions 823 protrude in the axial direction from the bottom 822 into the frame 821. The bottom 822 has a first bottom face 822a and a second bottom face 822b. The shaft-shaped protrusions 823 are provided upright on the first bottom face 822a. The second bottom face 822b is deeper than the first bottom face 822a in the axial direction. The other end of the connection terminal 80 extends up to a position higher than that of the first bottom face 822a.

A circuit board introduction port 820 is formed at the end of the frame 821 that is opposite to the bottom 822. The circuit board assembly 62 is introduced into the bottomed frame portion 82 through the circuit board introduction port 820. The end face of the frame 821 is an open end face 820a of the circuit board introduction port 820. The open end face 820a is an inclined flat face that is inclined with respect to the axial direction and the radial direction, and is formed at a position spaced farther away from the first housing member 7 in the radial direction than the flange portion 81. The connection terminals 80 pass through the bottom 822 in the axial direction, and the connector fitting portion 85 is provided opposite to the frame 821 across the bottom 822. The shaft-shaped protrusions 823 protrude from the bottom 822 toward the circuit board introduction port 820 up to a position higher than those of the connection terminals 80 in the axial direction.

Figure 6:
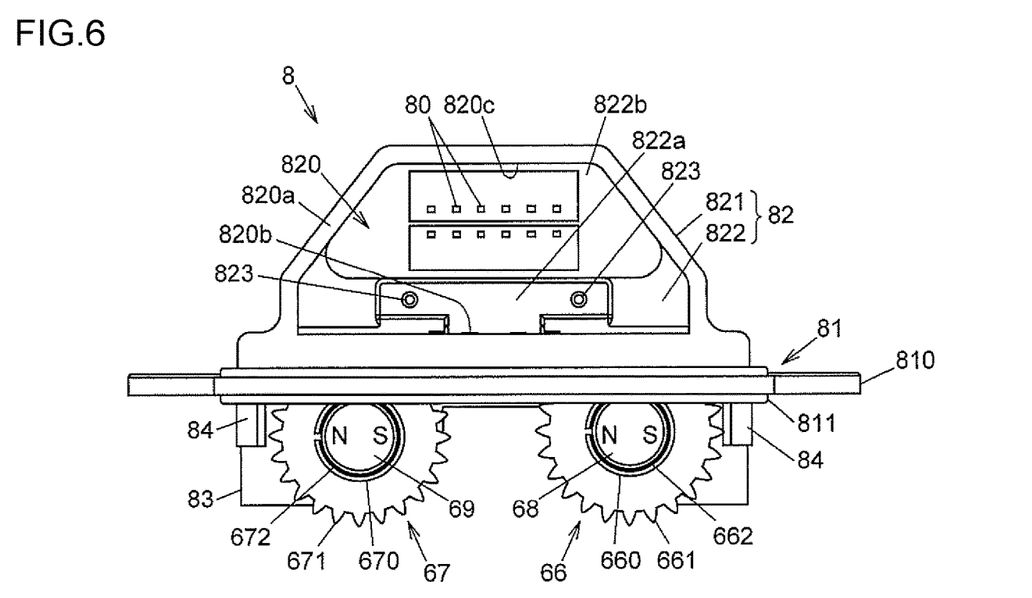
FIG. 6 is an illustration of the second housing member and the first and second driven gears as viewed in an axial direction.
Figure 7:
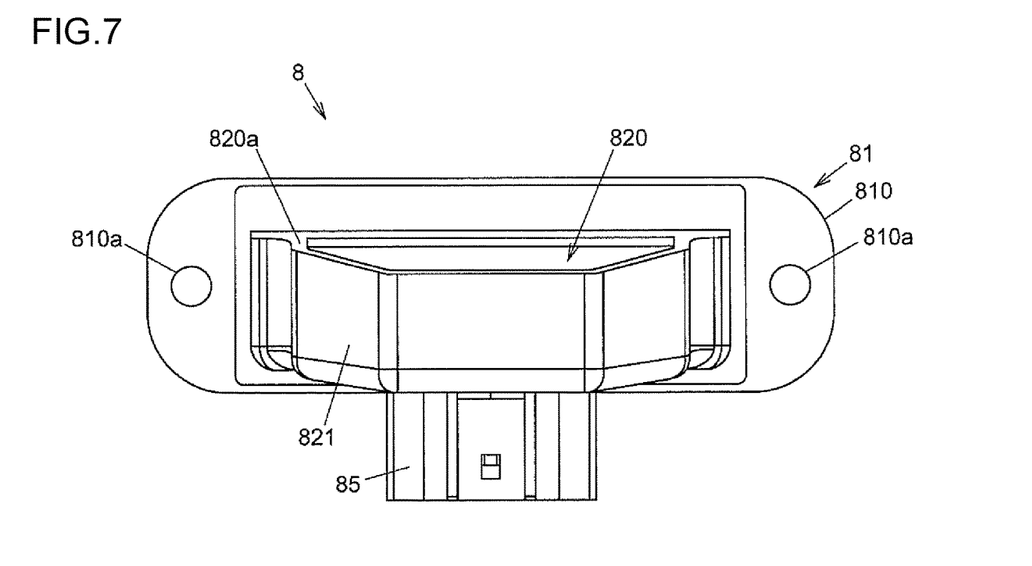
FIG. 7 is an illustration of the second housing member as viewed in a radial direction from a side opposite to a first housing member.

As illustrated in FIG. 6, the circuit board introduction port 820 has a substantially trapezoidal shape. When a part of the trapezoid on the flange portion 81 side is defined as a lower base 820b, the lower base 820b and an upper base 820c have linear shapes parallel to the flange portion 81. In the longitudinal direction of the flange portion 81 (lateral direction in FIG. 6), the length of the lower base 820b is larger than that of the upper base 820c, and is also larger than the length of the printed circuit board 620 in the same direction. In a direction orthogonal to the flange portion 81 (vertical direction in FIG. 6) that corresponds to the radial direction in FIG. 2, the distance between the lower base 820b and the upper base 820c is smaller than the length of the printed circuit board 620 in the same direction.

The printed circuit board 620 is held by the second housing member 8 perpendicularly to the axial direction. When the circuit board assembly 62 is introduced into the bottomed frame portion 82 through the circuit board introduction port 820, the printed circuit board 620 is positioned such that the distal ends of the shaft-shaped protrusions 823 are inserted through the insertion holes 620d of the printed circuit board 620. Then, the printed circuit board 620 is moved in the axial direction relative to the second housing member 8. Thus, the connection terminals 80 are inserted through the electrodes 626 formed by the through holes. Then, the electrodes 626 and the connection terminals 80 are electrically connected together by, for example, soldering. Accordingly, the connection terminals 80 and the electrodes 626 are connected together by the connection structure in which the circuit board assembly 62 is fitted to the second housing member 8 by being moved relatively in the axial direction inside the second housing member 8. With this structure, the connection terminals 80 and the electrodes 626 can electrically be connected together easily.

The circuit board introduction port 820 has a shape and size that allow a part of the circuit board assembly 62 to be inserted through an inner side of the flange portion 81 by moving the circuit board assembly 62 in the radial direction relative to the second housing member 8. A step of mounting the circuit board assembly 62 by introducing the circuit board assembly 62 into the second housing member 8 is described later in detail.

The circuit board introduction port 820 is closed by the lid 9 after the circuit board assembly 62 is mounted on the second housing member 8. At this time, the bottomed frame portion 82 is sealed such that the edge of the lid 9 abuts against the open end face 820a of the circuit board introduction port 820. The lid 9 is formed of a resin such as nylon 66, and is joined to the frame 821 by, for example, laser welding, ultrasonic welding, or bonding. The lid 9 is provided with a plurality of protrusions 91 and 92 (illustrated in FIG. 2) on an inner face 9a that faces the circuit board assembly 62. The protrusions 91 and 92 engage with inner sides of the end of the frame 821 on the circuit board introduction port 820 side.

As described above, the open end face 820a of the circuit board introduction port 820 is the inclined flat face, and therefore an outer face 9b of the lid 9 attached to the open end face 820a is inclined with respect to the axial direction. In a state in which the steering system 1 is mounted on the vehicle, the inclination angle of the outer face 9b of the lid 9 with respect to a vertical direction of the vehicle increases.

For example, if the vehicle is traveling in the rain and water droplets splashed by the front wheel 13 adhere to the outer face 9b of the lid 9, the water droplets easily run down by the gravity. Thus, the waterproof property of the sensor housing 61 is enhanced.

Figure 8:
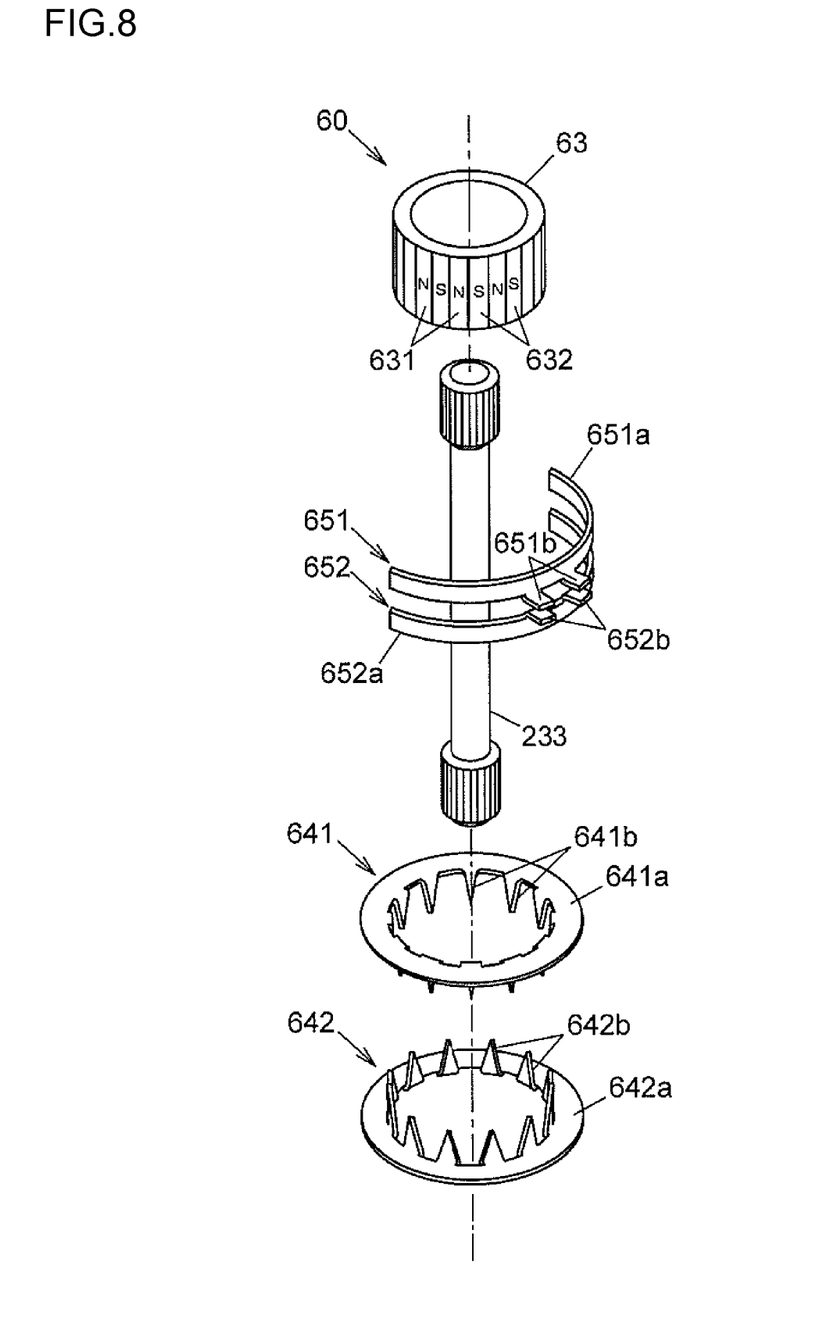
FIG. 8 is an exploded perspective view illustrating components of a torque detecting portion.

Next, the structure of a torque detecting portion 60 of the sensor device 6, which detects the steering torque based on the twisting amount of the torsion bar 233, is described with reference to FIG. 8 and other figures. In this embodiment, the torque detecting portion 60 is constituted by a magnetic circuit including the ring magnet 63, the first and second yokes 641 and 642, and the first and second magnetic flux collecting rings 651 and 652, and by the torque detection magnetic sensors 623 and 624.

The ring magnet 63 is a multipole permanent magnet in which a plurality of N poles 631 and a plurality of S poles 632 are alternately arranged along a circumferential direction. The ring magnet 63 is fixed to the outer peripheral surface of the input shaft 231 via a fixing member 630, and rotates together with the input shaft 231.

The first yoke 641 has a surrounding portion 641a having a ring-plate shape and a plurality of triangular claw portions 641b. The surrounding portion 641a surrounds the ring magnet 63. The claw portions 641b are bent from the inner peripheral edge of the surrounding portion 641a to protrude in the axial direction. The second yoke 642 has a surrounding portion 642a having a ring-plate shape and a plurality of triangular claw portions 642b. The surrounding portion 642a surrounds the ring magnet 63 at a position spaced away from the first yoke 641 in the axial direction. The claw portions 642b are bent from the inner peripheral edge of the surrounding portion 642a to protrude in the axial direction. The total of the numbers of the claw portions 641b and 642b of the first and second yokes 641 and 642 is equal to the number of magnetic poles of the ring magnet 63. In the example illustrated in FIG. 8, each of the numbers of the claw portions 641b and 642b is 12, and each of the numbers of the N poles 631 and the S poles 632 is also 12.

Figure 9:
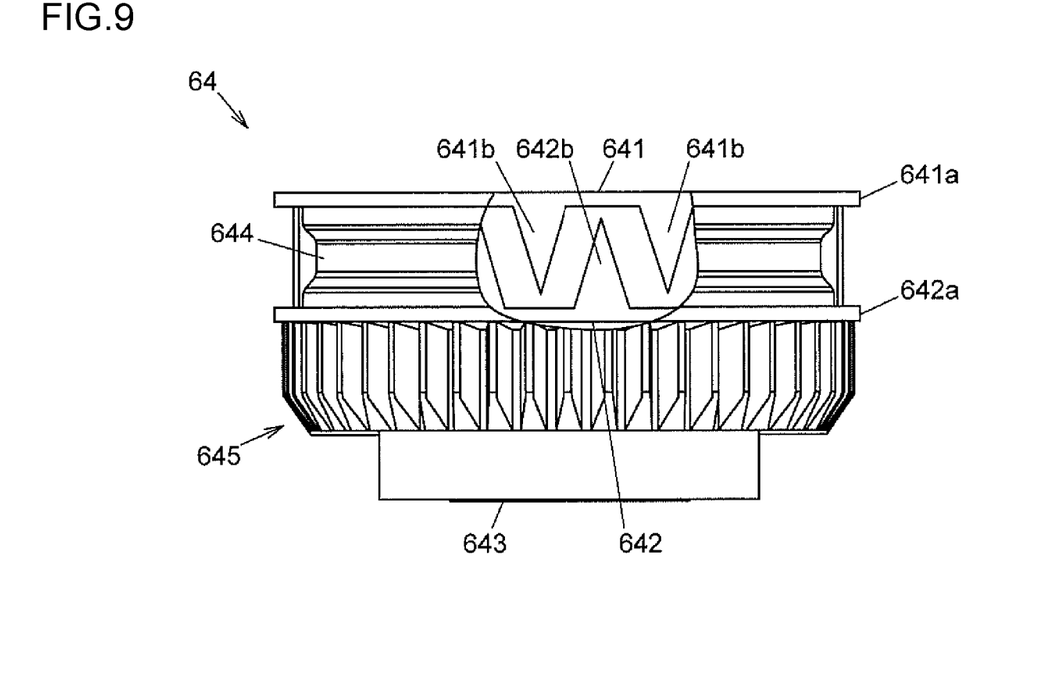
FIG. 9 is a partially cutaway side view illustrating a yoke unit.

Each of the surrounding portions 641a and 642a of the first and second yokes 641 and 642 has a flat-plate shape perpendicular to the axial direction. As illustrated in FIG. 9, the claw portions 641b of the first yoke 641 and the claw portions 642b of the second yoke 642 are alternately arranged with predetermined distances therebetween in the circumferential direction, and face the outer peripheral surface of the ring magnet 63. The surrounding portion 641a of the first yoke 641 and the surrounding portion 642a of the second yoke 642 are arranged in parallel to each other with a predetermined distance therebetween in the axial direction, and the outer peripheral edge of each of the surrounding portions 641a and 642a protrudes from the outer peripheral surface of the resin portion 644 of the yoke unit 64. FIG. 9 illustrates the inner peripheral surface of the yoke unit 64 at a cutaway part.

The first magnetic flux collecting ring 651 has an arc-shaped magnetic flux collecting portion 651a and a pair of tongue portions 651b. The magnetic flux collecting portion 651a is arranged on the outer periphery of the surrounding portion 641a of the first yoke 641. The tongue portions 651b protrude radially outward from the magnetic flux collecting portion 651a. The second magnetic flux collecting ring 652 has an arc-shaped magnetic flux collecting portion 652a and a pair of tongue portions 652b. The magnetic flux collecting portion 652a is arranged on the outer periphery of the surrounding portion 642a of the second yoke 642. The tongue portions 652b protrude radially outward from the magnetic flux collecting portion 652a. In this embodiment, each of the magnetic flux collecting portions 651a and 652a has a semicircular shape, but may be formed into an annular shape.

The ring magnet 63 is an example of a torque detection permanent magnet of the present invention, and generates a magnetic flux in the magnetic path including the first and second magnetic flux collecting rings 651 and 652. The first and second magnetic flux collecting rings 651 and 652 are examples of a pair of soft magnetic bodies of the present invention, and the tongue portions 651b of the first magnetic flux collecting ring 651 and the tongue portions 652b of the second magnetic flux collecting ring 652 are examples of facing portions of the present invention, which face each other in the axial direction.

The magnetic flux of the first yoke 641 is collected in the tongue portions 651b by the first magnetic flux collecting ring 651. The magnetic flux of the second yoke 642 is collected in the tongue portions 652b by the second magnetic flux collecting ring 652. The magnetic sensors 623 and 624 are arranged between the tongue portions 651b of the first magnetic flux collecting ring 651 and the tongue portions 652b of the second magnetic flux collecting ring 652, respectively, and detect the intensity of a magnetic field between the tongue portions 651b of the first magnetic flux collecting ring 651 and the tongue portions 652b of the second magnetic flux collecting ring 652.

When the torsion bar 233 is twisted by the steering torque, the first and second yokes 641 and 642 rotate relative to the ring magnet 63 based on the twisting amount, thereby changing a relative positional relationship between the claw portions 641b and 642b of the first and second yokes 641 and 642 and the N poles 631 and the S poles 632 of the ring magnet 63. The change in the positional relationship causes a change in the magnetic field between the tongue portions 651b of the first magnetic flux collecting ring 651 and the tongue portions 652b of the second magnetic flux collecting ring 652 based on the twisting amount of the torsion bar 233. The controller 50 can determine the steering torque through calculation based on detection signals from the magnetic sensors 623 and 624.

Figure 10:
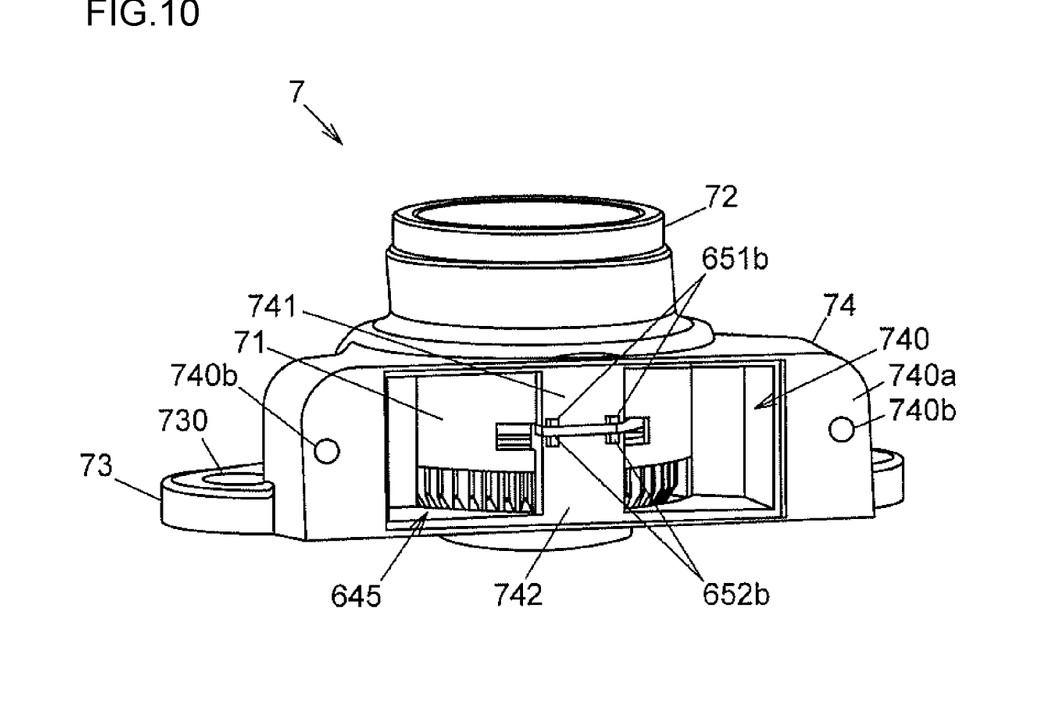
FIG. 10 is a perspective view illustrating the first housing member and the yoke unit.
Figure 11:
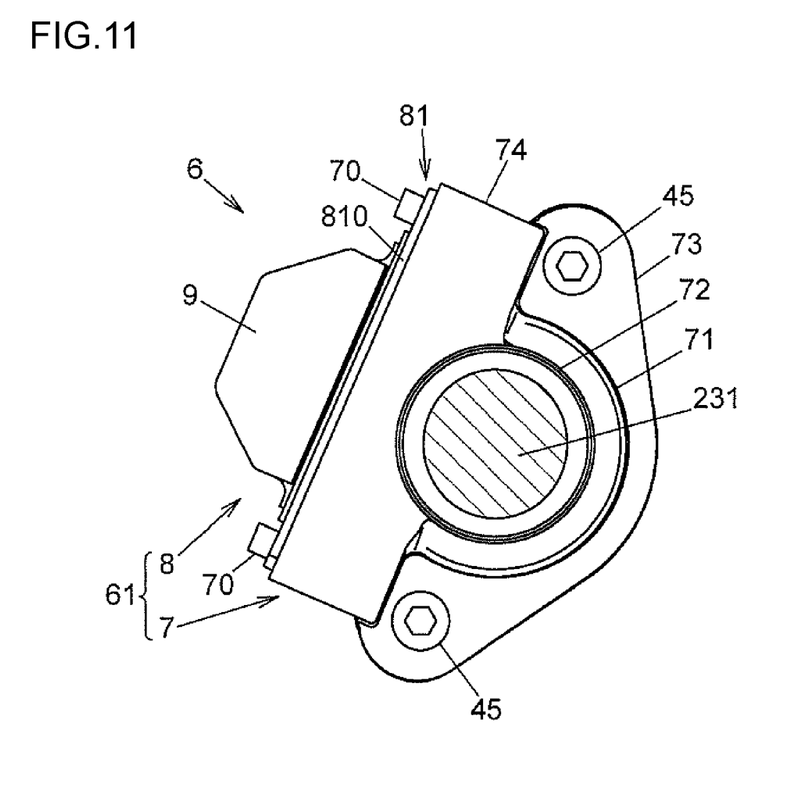
FIG. 11 is an illustration of the sensor device as viewed in the axial direction.

The first housing member 7 is formed of a thermoplastic resin such as nylon 66, and the first and second magnetic flux collecting rings 651 and 652 are molded in the first housing member 7 by insert molding. As illustrated in FIG. 10 and FIG. 11, the first housing member 7 integrally has a large-diameter tubular portion 71, a small-diameter tubular portion 72, a flange portion 73, and a fitting portion 74. The large-diameter tubular portion 71 houses the yoke unit 64. The input shaft 231 is inserted through the small-diameter tubular portion 72. The flange portion 73 protrudes outward from the large-diameter tubular portion 71. The second housing member 8 is fitted to the fitting portion 74. A pair of bolt insertion holes 730 are formed in the flange portion 73. Bolts 45 for fixing the first housing member 7 to the first tubular portion 41 of the rack housing 4 are inserted through the bolt insertion holes 730. FIG. 10 illustrates one bolt insertion hole 730 out of the pair of bolt insertion holes 730.

A fitting hole 740 open in the radial direction is formed in the fitting portion 74 of the first housing member 7. Threaded holes 740b are formed in an open end face 740a of the fitting hole 740. The bolts 70 for fixing the second housing member to the first housing member 7 threadedly engage with the threaded holes 740b. The fitting portion 74 is provided with a first wall 741 and a second wall 742. The first wall 741 supports the tongue portions 651b of the first magnetic flux collecting ring 651. The second wall 742 supports the tongue portions 652b of the second magnetic flux collecting ring 652.

Figure 3:
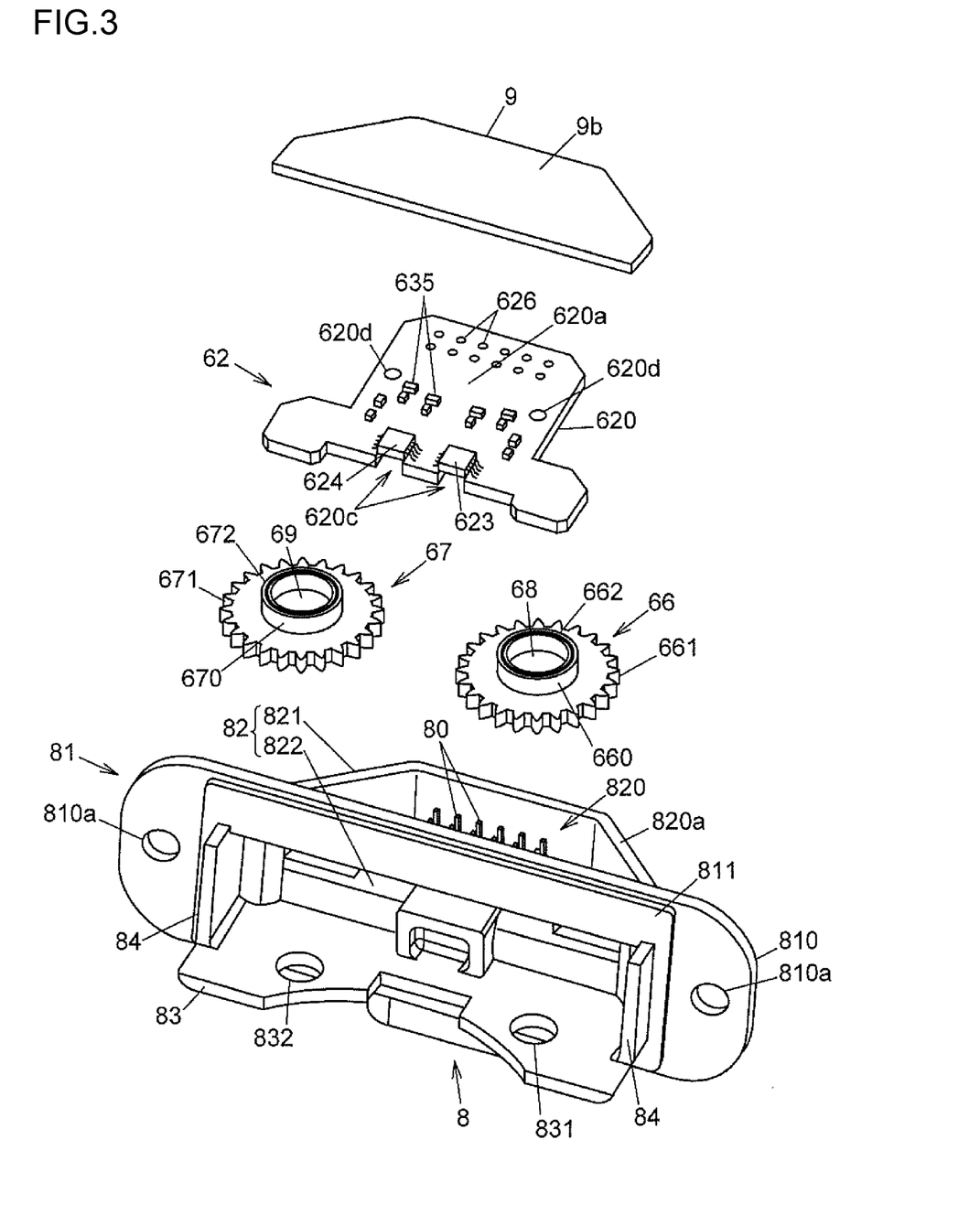
FIG. 3 is a perspective view illustrating a second housing member, first and second driven gears, first and second permanent magnets, a circuit board assembly, and a lid of the sensor device.
Figure 4:
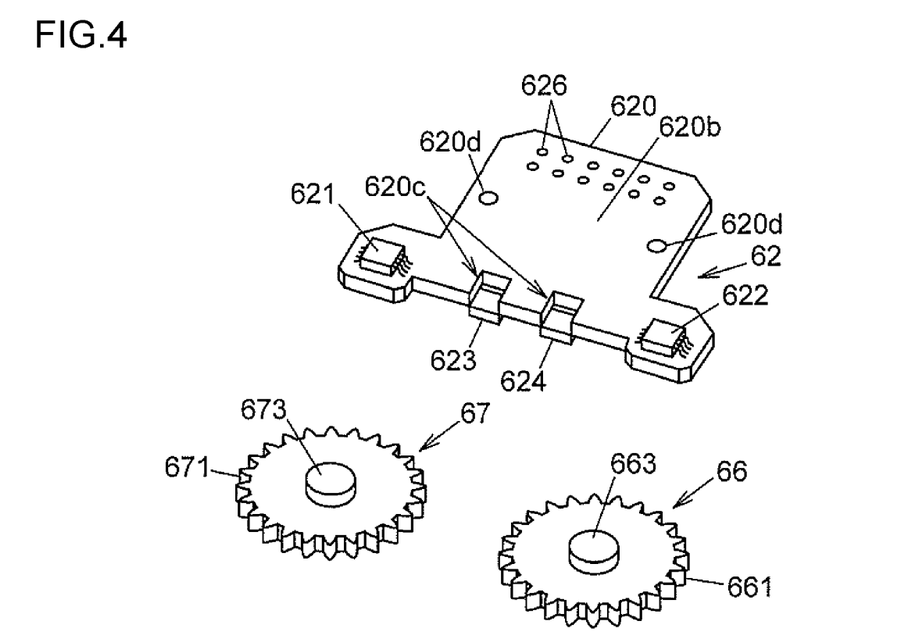
FIG. 4 is a perspective view of the first and second driven gears and the circuit board assembly as viewed in a direction different from that in FIG. 3.
Figure 5:
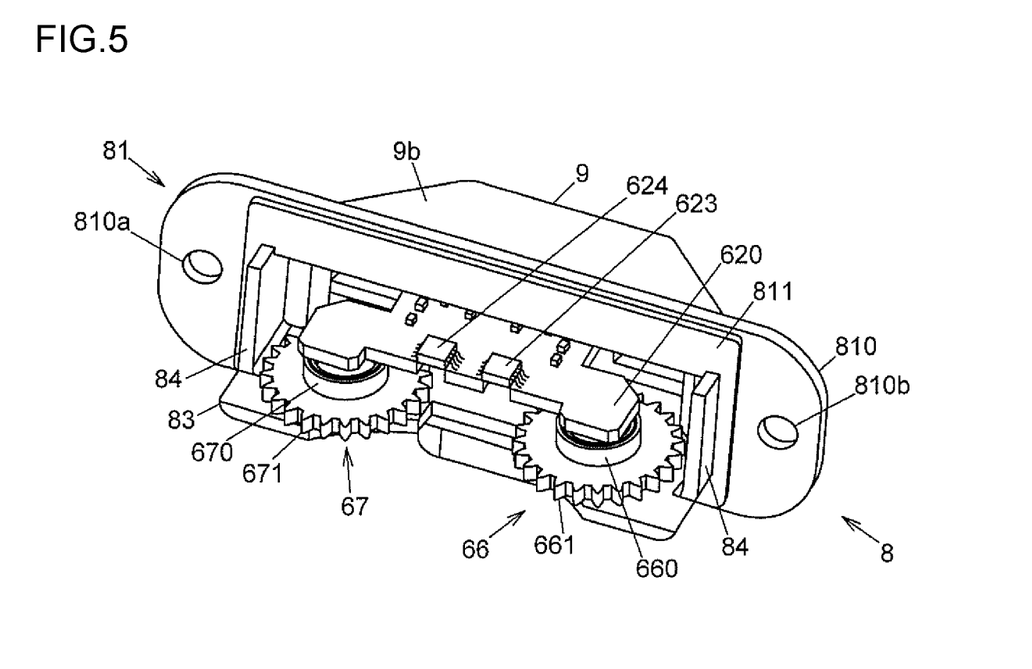
FIG. 5 is a perspective view illustrating an assembly of the second housing member, the first and second driven gears, the first and second permanent magnets, the circuit board assembly, and the lid.

In the second housing member 8, the steel plate 810 of the flange portion 81 is brought into abutment against the open end face 740a of the fitting portion 74, and the bolts 70 inserted through the bolt insertion holes 810a threadedly engage with the threaded holes 740b, thereby fixing the second housing member 8 to the first housing member 7. As illustrated in FIG. 3 and other figures, in the flange portion 81, a fitting portion 811 formed of a resin protrudes toward the side plate portions 84 with respect to the steel plate 810, and is fitted to the fitting hole 740. Thus, the fitting hole 740 of the first housing member 7 is closed by the second housing member 8.

In the first driven gear 66, a part of the gear portion 661 protrudes from the flange portion 81, and the protruding part is inserted into the large-diameter tubular portion 71 through the fitting hole 740 of the first housing member 7 and meshes with the external gear 645 of the yoke unit 64. Similarly, in the second driven gear 67, a part of the gear portion 671 protrudes from the flange portion 81, and the protruding part is inserted into the large-diameter tubular portion 71 through the fitting hole 740 of the first housing member 7 and meshes with the external gear 645 of the yoke unit 64. When the pinion shaft 23 rotates inside the first tubular portion 41 of the rack housing 4, the first driven gear 66 and the second driven gear 67 rotate at different speeds based on the difference between the numbers of teeth.

Next, a manufacturing process for mounting the circuit board assembly 62 on the second housing member 8 and closing the circuit board introduction port 820 by the lid 9 is described with reference to FIG. 12A to FIG. 12D. FIG. 12A to FIG. 12D illustrate first to fourth steps of the manufacturing process. The circuit board assembly 62 is mounted on the second housing member 8 by using, for example, an orthogonal two-axis robot configured to move an object in an X direction and a Y direction illustrated in FIG. 12A. The X direction and the Y direction correspond to the axial direction and the radial direction, respectively, in a state in which the sensor device 6 is attached to the first tubular portion 41 of the rack housing 4. For example, an orthogonal three-axis robot configured to move an object in a direction orthogonal to the X direction and the Y direction may be used as long as the object can be moved in the X direction and the Y direction.

Figure 12A:
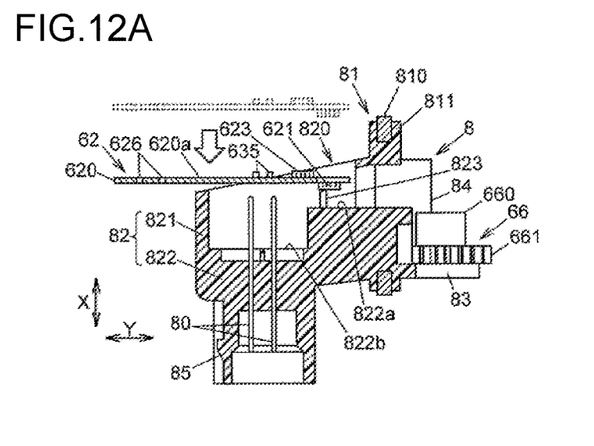
FIG. 12A to FIG. 12D are explanatory drawings illustrating first to fourth steps of a manufacturing process for mounting the circuit board assembly on the second housing member and closing a circuit board introduction port with the lid.

In the first step illustrated in FIG. 12A, the second housing member 8 on which the first and second driven gears 66 and 67 are supported in advance is fixed to a jig (not illustrated). The circuit board assembly 62 is moved in the X direction while being gripped by a robotic hand (not illustrated), and a part of the circuit board assembly 62 is introduced into the bottomed frame portion 82 through the circuit board introduction port 820.

Figure 12B:
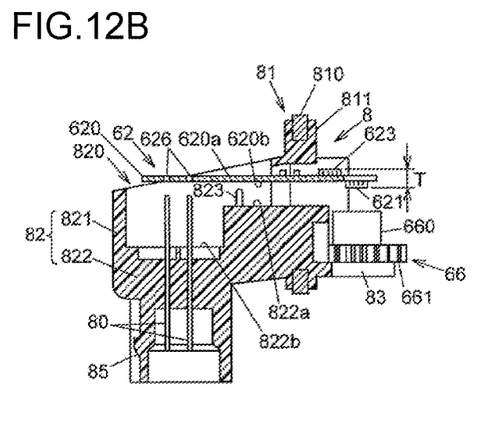

In the second step illustrated in FIG. 12B, the circuit board assembly 62 is moved in the Y direction, and a part of the circuit board assembly 62 is inserted through the inner side of the flange portion 81. At this time, the circuit board assembly 62 is positioned so that the insertion holes 620d of the printed circuit board 620 and the shaft-shaped protrusions 823 face each other in the X direction. FIG. 12B illustrates a thickness T of the circuit board assembly 62. The thickness T is a dimension obtained by adding together the thickness of the printed circuit board 620 itself, the height of a component that is highest from the first mounting surface 620a (torque detection magnetic sensors 623 and 624 in this example) among the electronic components mounted on the first mounting surface 620a of the printed circuit board 620, and the height of a component that is highest from the second mounting surface 620b (rotation angle detection magnetic sensors 621 and 622 in this example) among the electronic components mounted on the second mounting surface 620b of the printed circuit board 620.

Figure 12C:
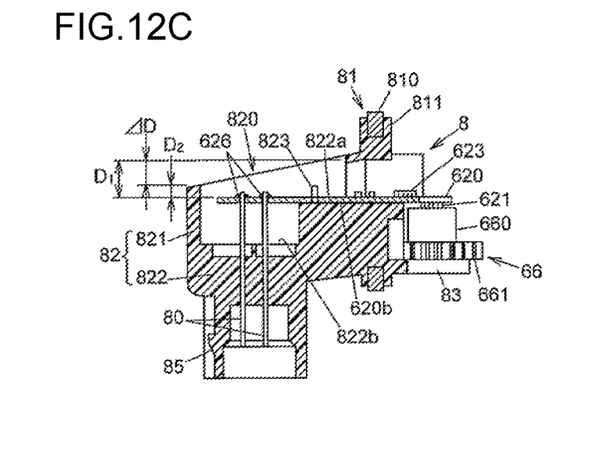

In the third step illustrated in FIG. 12C, the circuit board assembly 62 is moved toward the bottom 822 of the bottomed frame portion 82. The shaft-shaped protrusions 823 are inserted through the insertion holes 620d of the printed circuit board 620, and the connection terminals 80 are inserted through the electrodes 626 of the printed circuit board 620. Thus, the second mounting surface 620b of the printed circuit board 620 is brought into abutment against the first bottom face 822a of the bottom 822. Then, the electrodes 626 and the connection terminals 80 are soldered together.

As illustrated in FIG. 12C, $D_1$ represents a distance in the X direction between the printed circuit board 620 abutting against the first bottom face 822a of the bottom 822 and the end of the circuit board introduction port 820 on the flange portion 81 side, and $D_2$ represents a distance in the X direction between the printed circuit board 620 abutting against the first bottom face 822a of the bottom 822 and the end of the circuit board introduction port 820 that is opposite to the flange portion 81. A difference between $D_1$ and $D_2$, that is, $\Delta D (=D_1-D_2)$ is equal to or larger than the thickness T of the circuit board assembly 62. With this dimensional relationship, the circuit board assembly 62 can be moved to a predetermined position in the Y direction in the second step without interference of the printed circuit board 620 or the electronic component of the circuit board assembly 62 with the flange portion 81 or the frame 821. Then, the shaft-shaped protrusions 823 can be inserted through the insertion holes 620d and the connection terminals 80 can be inserted through the electrodes 626 by further moving the circuit board assembly 62 in the X direction.

Figure 12D:
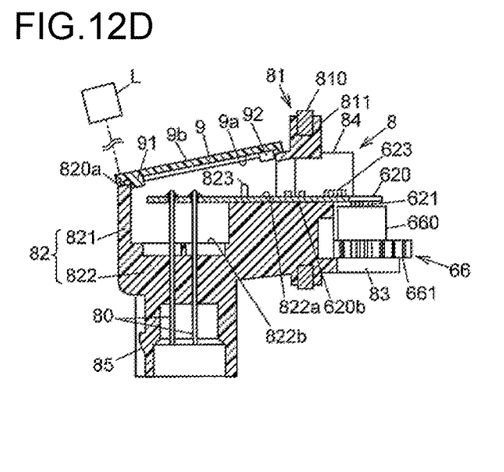

In the fourth step illustrated in FIG. 12D, the edge of the lid 9 is joined to the open end face 820a of the circuit board introduction port 820. FIG. 12D illustrates a case where the lid 9 is joined to the second housing member 8 by laser welding. In this case, the lid 9 is formed of a resin having light transmittance at a wavelength of a laser beam radiated from a light source L, and the second housing member 8 is formed of a resin having no light transmittance. The laser beam passes through the lid 9 to melt a part of the frame 821, thereby joining the edge of the lid 9 to the open end face 820a of the circuit board introduction port 820 in a liquid-tight manner.

According to the embodiment described above, the flange portion 81 of the second housing member 8 is brought into abutment against the open end face 740a of the fitting hole 740 formed in the first housing member 7. Therefore, the fitting hole 740 is closed, and the first and second driven gears 66 and 67 are inserted into the first housing member 7 and meshed with the external gear 645. Thus, the sensor device 6 can be easily mounted. The first housing member 7 and the second housing member 8 can be formed by insert molding of a resin, and are therefore easily machinable. Thus, the manufacturing cost of the sensor device 6 can be reduced.

Relative positions of the circuit board assembly 62 and the second housing member 8 in the radial direction can be checked visually through the circuit board introduction port 820. Thus, an operator can carry out a visual check when the circuit board assembly 62 is mounted manually, or the relative positions can be checked by using a camera and an image recognition device when the circuit board assembly 62 is mounted automatically by a machine.

Although the present invention has been described above based on the embodiment, the invention of the claims is not limited to the embodiment. All combinations of the features described in the embodiment are not essential for the solution to the problem of the invention.

The present invention may be modified as appropriate without departing from the spirit of the present invention. For example, the embodiment described above is directed to the exemplary steering system 1 in which the sensor device 6 is applied to the pinion shaft 23 of the steering shaft 2. The present invention is not limited to this case. The sensor device 6 may be applied to the column shaft 21. In this case, the sensor device 6 is arranged on a vehicle cabin side of the dash panel 14, and therefore the lid 9 need not be joined to the second housing member 8 in a liquid-tight manner.

The application of the sensor device 6 is not limited to the steering system of the vehicle. The sensor device 6 may be applied to various devices.

What is claimed is:

1. A sensor device configured to detect a rotation angle of a shaft with respect to a support, the shaft being supported so as to be rotatable relative to the support, the sensor device comprising:
   an external gear configured to rotate together with the shaft;
   a driven gear configured to rotate by meshing with the external gear;
   a rotation angle detection permanent magnet configured to rotate together with the driven gear;
   a rotation angle detection magnetic sensor configured to detect a magnetic field of the rotation angle detection permanent magnet;
   a circuit board assembly having the rotation angle detection magnetic sensor mounted on a printed circuit board;
   a tubular first housing member that houses the external gear; and
   a second housing member that supports the driven gear and houses the circuit board assembly, wherein
   the first housing member has a fitting hole open in a radial direction perpendicular to a rotation axis of the shaft, and
   the second housing member has a flange portion that abuts against an open end face of the fitting hole, and a part of the driven gear that protrudes from the flange portion is inserted into the first housing member and meshed with the external gear.

2. The sensor device according to claim 1, wherein the sensor device includes a second driven gear configured to rotate by meshing with the external gear, and the numbers of teeth of the driven gear and the second driven gear are different from each other.

3. The sensor device according to claim 1, wherein a rotation axis of the driven gear is located on the first housing member side with respect to the flange portion.

4. The sensor device according to claim 1, further comprising a lid attached to the second housing member, wherein
   the second housing member has a circuit board introduction port formed at a position spaced farther away from the first housing member in the radial direction than the flange portion,
   the circuit board introduction port has a shape and size that allow a part of the circuit board assembly to be inserted through an inner side of the flange portion by moving the circuit board assembly in the radial direction relative to the second housing member, and
   the circuit board introduction port is closed by the lid.

5. The sensor device according to claim 4, wherein
   a plurality of connection terminals extending parallel to the rotation axis are fixed to the second housing member, and the circuit board assembly is provided with a plurality of electrodes electrically connected to the plurality of connection terminals, and
   the plurality of connection terminals and the plurality of electrodes are connected together by a connection structure in which the circuit board assembly is fitted to the second housing member by being moved relatively parallel to the rotation axis inside the second housing member.

6. The sensor device according to claim 4, wherein
   the printed circuit board is held by the second housing member perpendicularly to the rotation axis of the shaft, and
   a distance parallel to the rotation axis between an end of the circuit board introduction port on the flange portion side and the printed circuit board is larger than a distance parallel to the rotation axis between an end of the circuit board introduction port that is opposite to the flange portion and the printed circuit board, and a difference between the distances is equal to or larger than a thickness of the circuit board assembly.

7. The sensor device according to claim 6, wherein
   an open end face of the circuit board introduction port of the second housing member is an inclined flat face that is inclined with respect to the rotation axis and the radial direction, and
   an edge of the lid formed into a flat-plate shape is joined to the inclined flat face.

8. The sensor device according to claim 1, wherein
   the shaft is formed by coupling a pair of rotation shaft members together by a flexible torsion shaft,
   the sensor device further includes a torque detecting portion configured to detect a torque transmitted between the pair of rotation shaft members based on a twisting amount of the torsion shaft,
   the torque detecting portion includes:
   a pair of soft magnetic bodies having facing portions that face each other in a direction parallel to the rotation axis;
   a torque detection permanent magnet configured to generate a magnetic flux in a magnetic path including the pair of soft magnetic bodies; and
   a torque detection magnetic sensor configured to detect a magnetic field that changes between the facing portions based on the twisting amount of the torsion shaft, and
   the torque detection magnetic sensor is mounted on the printed circuit board.

9. The sensor device according to claim 8, wherein the pair of soft magnetic bodies are molded by insert molding in the first housing member formed of a resin.

* * * * *